Figure 1:
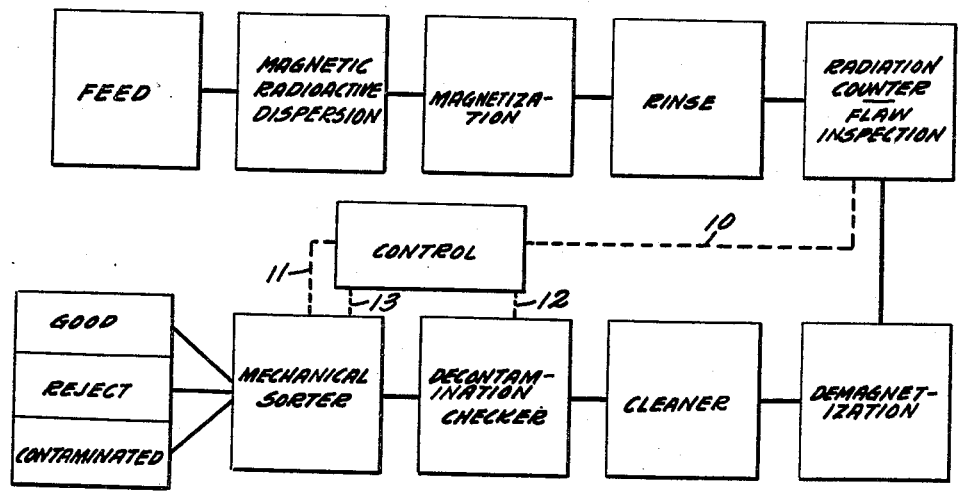

Feb. 26, 1963   H. E. FARMER ET AL   3,078,995
RADIOACTIVE MAGNETIC PARTICLE INSPECTION
Filed Oct. 23, 1958

INVENTORS
HERBERT E. FARMER
ARTHUR H. BUCKLEY
BY
ATTORNEY- 3,078,995
RADIOACTIVE MAGNETIC PARTICLE INSPECTION
Herbert Edward Farmer, Lynn, and Arthur Hever Buckley, Salem, Mass., assignors to General Electric Company, a corporation of New York
Filed Oct. 23, 1958, Ser. No. 769,152
9 Claims. (Cl. 209—111.5)

The present invention relates to a radioactive magnetic particle inspection method and apparatus and to the materials and dispersions, which are both magnetic and radioactive used therewith.

In the manufacture of many articles of magnetic materials, rigid inspection is essential to maintain high standards of quality and flaw detection is an important phase of such rigid inspection.

Nondestructive tests are designed to indicate surface or near-surface or defects without destroying or damaging the article being examined. Such tests are used primarily on articles designed for hazardous or critical service or having a high finished value for which destructive tests would be too expensive. In one such nondestructive test known as magnetic particle inspection, magnetic particles are applied to an article in which a magnetic field has been induced. The particles are then attracted to a surface or near-surface defect or flaw existing in the article. An accumulation of particles which occurs at such a defect because of magnetic flux distortion and resulting leakage field at that point makes possible a noticeable indication proportional to the extent of the defect. Proper use of magnetic particle inspection requires considerable experience by human operators in the interpretation of such accumulations or defect indications and the evaluation of defects. Experience has shown that two major limitations of conventional magnetic particle inspection of mass produced articles are that ordinary visual methods require individual interpretation dependent on the skill of a human operator and that such operator in looking at a predominance of satisfactory articles tends, as he fatigues, to approve some articles which are actually unacceptable.

It is an object of this invention to provide mechanization of magnetic particle inspection apparatus and methods by incorporating use of radioactive sensing means to detect materials of a sensitivity sufficient to allow accurate acceptance or rejection of a large percentage of articles so inspected.

Another object of our invention is to provide magnetic particle inspection methods, apparatus and materials which will provide detectable contrasts between the accumulation at small defects and the general surface background of the article being inspected and yet maintain the radioactivity at a level safe for human operators.

Briefly stated in accordance with one aspect of our invention, we provide a radioactive magnetic particle inspection apparatus which is mechanized to automatically separate flaw-bearing articles from a group of articles being inspected, thereby allowing skilled human operators to evaluate principally questionable rather than principally satisfactory articles. In one form our method comprises the automatically consecutive steps of subjecting an article to contact with a dispersion of magnetic radioactive particles, magnetizing the article so that the radioactive particles will accumulate in defective areas and then inspecting the article to compare the radioactivity of the dispersion on the surface of the article with a predetermined standard.

Figure 2:
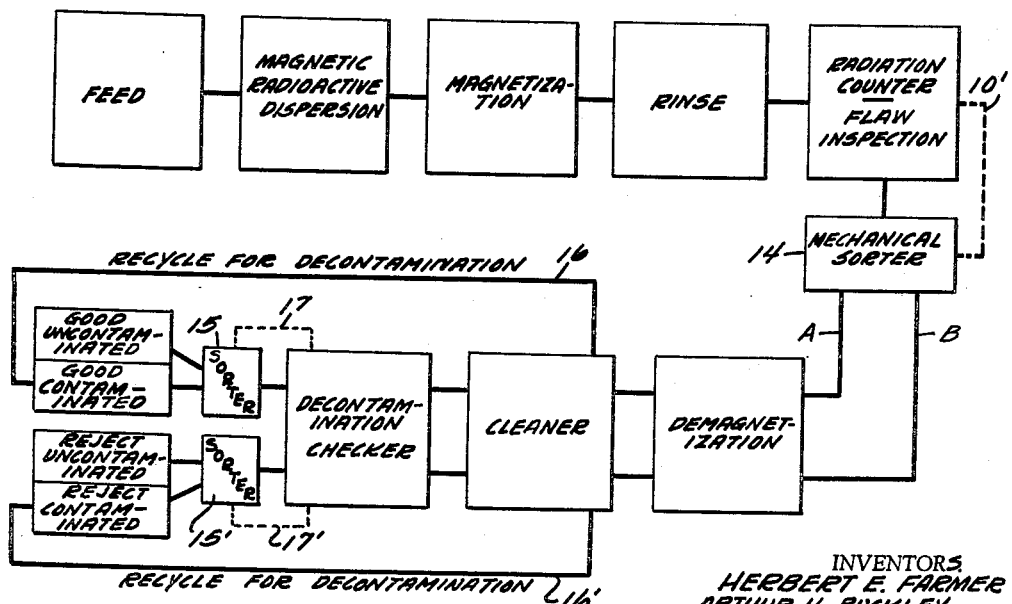

The subject matter which we regard as our invention is particularly pointed out and distinctly claimed in the concluding portion of this specification. Our invention, however, both as to organization and method of operation, together with further objects and advantages thereof, may be best understood by reference to our description taken in connection with the accompanying drawings in which:

FIGS. 1 and 2 are two schematic representations of arrangements of which our apparatus is capable in its mechanized form.

The use of magnetic particles which have been irradiated allows our provision of an accurate mechanized magnetic particle inspection method. However, we believe that the level of radioactivity of the magnetic particles must be within the range of 0.01–100 millicuries per gram of magnetic material in order to be at a proper level for detection and yet be controllably safe for use by human operators.

The proper level of radiation varies among articles being inspected, the best level of radioactivity in a dispersion of magnetic materials in a fluid being determined experimentally in any given case. For example, if iron-59 is to be considered, the millicurie strength (mc.), necessary to obtain a sufficiently high contrast of radioactive magnetic iron particles attracted to a flaw to yield a count of statistically significant difference from a part without a flaw can be calculated using standard reactor irradiated units and well known statistical formulas.

Based on our knowledge of physics and our experience with conventional magnetic particle inspection, we made the following calculations. We concluded that with a millicurie strength of about 1.0 millicurie per gram (mc./gm.) of material we could obtain a high contrast at controlled safety levels to the operator.

Our calculations were made using the specific activity reported from Oak Ridge Laboratories (OR) for iron-59 as being 0.15 mc./gm. for the standard reactor irradiated unit. Since our material was irradiated at Brookhaven National Laboratory (B), the specific activity expected for irradiating a standard reactor unit was calculated as follows:

$$(\text{sp.A})_B = (\text{sp.A})_{OR} \times \frac{\phi B}{\phi OR} \times \frac{[(1-\exp.(-\lambda T_B))]}{[(1-\exp.(-\lambda T_{OR}))]}$$

in which:

Specific activity, $(\text{sp. A})_{OR} = 0.15$ mc./gm.
Flux, $\phi B = 4 \times 10^{12}$ neutrons/cm.²/sec. (nv.)
Flux, $\phi OR = 5 \times 10^{11}$ nv.
Time, $T_B = 20$ days
Time, $T_{OR} = 28$ days
Constant (dis.) $\lambda(\text{Fe}^{59}) = 1.53 \times 10^{-2}$ days$^{-1}$
Exp.=base, natural logarithm therefore:

$$(\text{sp.A})_B \cong (0.15)(8)\left(\frac{0.27}{0.33}\right)$$

$$\cong 1.0 \text{ mc./gm.}$$

Since our material was about 3 parts iron-oxide particles and 1 part mineral oil, and assuming 70% by weight, of the iron oxides is iron, then the expected activity per gram of paste, per standard reactor irradiated unit is:

$$1\left(\frac{\text{mc.}}{\text{gm. of iron}}\right)\left(0.75 \times 0.7 \frac{\text{gm. of iron}}{\text{gm. of paste}}\right)$$

$$= 0.525 \frac{\text{mc.}}{\text{gm. of paste}}$$

By definition:

$1 \text{ mc.} = 2.22 \times 10^9$ disintegrations/minute

Therefore:

$0.5 \text{ mc.} \cong 10^9$ disintegrations/minute

Assuming it is necessary to have 100 counts above background to have statistically significant data, the theoretical limit of detection is:

$$\frac{100 \text{ c./m.}}{10^9 \text{ c./m.}} = 10^{-7} \text{ gm. of paste}$$

Since the detection efficiency of the counter, for the geometry and radiation used, was about 10%, the practical limit of detection was about $10^{-6}$ grams of paste.

This means that, if the general background due to the residual activity on a good blade is about a 1000 c./m., and if there is at least an additional $10^{-6}$ grams of paste attracted to a defect, the difference in counts between the two blades is statistically significant. Thus a flaw or defect can be detected using our type of automatic mechanized method and apparatus.

In the following sample calculation using an iron oxide paste, the paste was about 3 parts iron oxide particles and about 1 part carrier or surface active agent. Although in this calculation we mixed the iron oxide into a paste with the carrier, it should be understood that iron oxide powder alone can be used and in fact is preferred to a paste for irradiation. Assuming 70 percent by weight of the iron oxide is iron, then the expected activity per gram of material, per reactor irradiated unit which we use is 0.525 mc./gm. of material. In order to determine if this amount of material can be of a statistically significant amount, the following calculations can be employed:

By definition one millicure is equal to $2.22 \times 10^9$ disintegrations per minute. Therefore, 0.5 millicurie is about equal to $10^9$ disintegrations per minute.

The actual detection of a defect is based upon a significant statistical difference in count between a blade that is good and a blade with a rejectable flaw. A statistical formula for determining the confidence level (C.L.) of a significant difference between two counts obtained in equal counting periods for the level of radioactivity of articles is:

$$\left|\frac{N_1-N_2}{\sqrt{N_1+N_2}}\right|=T$$

where:

$N_1$ = count from one sample
$N_2$ = count from a different sample
$N_1 \geqq 25$
$N_2 \geqq 25$ If $T \geqq 0.674$, there is significant difference at the 50% C.L.
$T \geqq 1.64$, there is significant difference at the 90% C.L.
$T \geqq 1.96$, there is significant difference at the 95% C.L.
$T \geqq 2.58$, there is significant difference at the 99% C.L.

Although we have found, as we have shown above, that a statistically significant difference of the radioactivity could be produced and detected on an article between a flaw or defect and its background, we recognized that another important factor in our system was the amount of the irradiation necessary to produce material which would be safe with human operators. We have found that irradiated material within the range of 0.01–100 mc./gm. strength can be safely used with proper controls and shields. Although we have talked of materials in paste form, we have found that the use of powder alone not only substantially improves the process but the powder is more conveniently handled than the paste which has a tendency to cake during irradiation.

In one of our tests for the preparation and checking of irradiated paste in a dispersion to determine whether or not it was safe for use with human operators, we had subjected 33.4 grams of paste, including 3 parts of iron oxide particles and one part of mineral oil, to neutron bombardment in an air cooled hole. This bombardment produced nuclear reactions with the elements in the paste resulting in the emission of detectable radiation. The irradiation process was continued intermittently for a total of 553.5 hours in a neutron flux of $3.1 \times 10^{12}$ thermal neutrons per square centimeter per second at a temperature of 50°–75° C.

At the end of the irradiation period a dose rate of 1 Roentgen per hour at a distance of 1 foot from the unshielded paste was measured. Thus the dose rate received by personnel with proper shielding was found to be less than the maximum amounts permitted by Atomic Energy Commission regulations at this time.

The paste, due to the heating of the organic carrier, which in this example was mineral oil, came from the reactor in cake form. However, we ground the cake into fine particles in an automatic mortar and pestle grinder, and dispersed the particles in kerosene. The measured dose rate at the surface of two inches of lead enclosing a beaker containing the dispersion was less than 1 milli-Roentgen per hour.

It was found that the magnetic properties of the paste were not affected by the nuclear irradiation.

The articles which we selected for test were blades such as for use in elastic fluid flow apparatus, for example, gas turbine blades. The method which we used to detect flaws or defects was first to magnetize the blade longitudinally, passing about 1,000 amperes through a coil of eight turns to induce a magnetic field in the article. We then introduced, by dipping, the blades in the above described radioactive magnetic particle liquid dispersion to allow proper distribution of the particles on the surface of the blades. We then rinsed the blade with a bath of trichloroethylene to reduce excess radioactivity on the blade surface and accelerate drying. In some known magnetic particle inspection processes such a rinse tends to reduce accuracy rather than to increase accuracy as it does in our case. In this example we used trichloroethylene as a rinsing material.

Referring to FIGURE 1, our mechanized process which eliminates the need for human operators during the initial phases of inspection, begins with an automatic feed apparatus examples of which are vibratory, hopper and magazine types of feeds. The article to be inspected is then subjected to contract with a dispersion of magnetic radioactive particles. We prefer dipping into a tank containing a liquid comprising a dispersion of radioactive magnetic iron oxide particles in a carrier such as kerosene or water with the appropriate surface active agents, foam suppressors and the like. Agitation such as mechanical, vibratory, ultrasonic, etc. may be required to maintain an adequate dispersion. Although we prefer to use a liquid bath into which the article may be dipped, a liquid spray or dry fluidized bed type of dispersion may be used.

We next prefer to magnetize the article in as many directions necessary to cause accumulation of radioactive magnetic particles along all possible defect areas. In the case of blades we prefer to magnetize longitudinally.

Although we prefer to introduce the article into the magnetic radioactive dispersion prior to magnetization, similar results may be achieved by first magnetizing and then subjecting the article to the magnetic radioactive dispersion or performing the two operations simultaneously.

In order that the background radioactivity of the article being inspected may be reduced to a workable and detectable level in comparison with any defect existing in the article, we then prefer to rinse the article in a solvent which will remove excess radioactivity without materially affecting particles attracted to a flaw or defect. For example, we prefer to use an organic material such as trichloroethylene if an organic base such as kerosene was used in the magnetic radioactive dispersion or with water if water was used as such a base. Although we prefer to use a bath into which the article is introduced for rinsing purposes, a light soft spray of liquid or, in the case of a fluidized bed type of dispersion, a light spray of air may be used with equally good effect. If the article is likely to corrode because of moisture in the air or in the bath, we prefer to include corrosion inhibitors in this and other solutions used in our method and apparatus.

At this point in our mechanized inspection method the article to be inspected is in a condition whereby the difference in level between background radioactivity and defect radioactivity can be measured to determine acceptable or unacceptable articles. The radioactivity sensor, indicated as a radiation counter, selected for the flaw inspection step following the rinse step in our method is adjusted according to a calibration curve made from examination of a number of similar articles to determine statistically acceptable and questionable levels. The details of such sensor are not shown because of the availability of several types commercially.

Referring to FIGURE 1, the signal 10 from the radioactivity sensor is transmitted to a control unit which includes memory characteristics and which we prefer to include as part of our sorting means. From the control, a signal 11 is transmitted at the scheduled, programmed time to the sorting means, indicated as a mechanical sorter, so that the article may be placed in the appropriate category as shown.

After sensing or flaw inspection, the article is then demagnetized and cleaned with standard available equipment such as dip, spray, ultrasonic etc. to remove the magnetic radioactive material remaining on its surface. After cleaning, the article is passed to a second radioactivity sensor indicated as a decontamination checker which sends a signal 12 indicating the level of radioactivity to the control which in turn schedules a signal 13 to the sorting means whereby the article after passing through the decontamination checker and into the sorter may be sorted into the appropriate category. Thus the control co-ordinates and schedules signals transmitted from the two radioactivity sensing means to sort the articles as indicated in FIGURE 1.

FIGURE 2 represents our apparatus in another mechanized arrangement. In FIGURE 2 the sorting means is located immediately after the first radioactivity sensor or radiation counter so that the sorter can divide the articles being inspected into two separate paths, A for acceptable or "good" articles and B for rejected articles, in order that the control of the type described in FIGURE 1 may be replaced, if such is desirable, with a sorting means such as shown at 14, 15, and 15', FIGURE 2.

In connection with FIGURE 2 it is to be noted that a recycling arrangement 16 and 16' may be included to pass articles being inspected back into the cleaning cycle for additional cleaning and passage through the decontamination checker until the signals 17 and 17' from the decontamination checker to the sorter indicates the article is uncontaminated.

Thus the need for human operators in our radioactive magnetic particle inspection system has been eliminated. After inspection, articles which have been rejected and decontaminated may then be given to a skilled human operator for standard magnetic particle inspection so that he may more efficiently use his experience to judge if in fact the article is an unsatisfactory one. By elimination of the need for human operators in a large portion of magnetic particle inspection of articles, we have greatly improved the producivity of any system relying on such nondestructive tests.

With the above understanding of the operations by means of which the present invention may be practiced, those skilled in the art will understand how to adapt existing machines and or to build other machines and equivalent arrangements to carry out the method aspects of the present invention.

What is claimed is:

1. A mechanized magnetic particle inspection method comprising the automatically consecutive steps of: contacting an article of magnetic material with a dispersion of magnetic radioactive particles having a level of radioactivity of 0.01–100 millicuries per gram of material; inducing a magnetic field in the article to position the particles preferentially at defective areas; measuring the radioactivity of the dispersion on the article; demagnetizing the article; cleaning the article to remove the magnetic radioactive dispersion; measuring the radioactivity of any dispersion remaining on the article to determine if the article can be safely handled by human beings; and then sorting the article into acceptable and unacceptable groups.

2. The method of claim 1 in which the magnetic radioactive particles are substantially iron oxide.

3. A mechanized magnetic particle inspection apparatus including conveying means to move an article of magnetic material through said apparatus automatically, comprising in combination; a magnetic radioactive dispersion treating container to receive the article; means to induce a magnetic field in the article whereby said treated article is magnetized; first radioactivity sensing means to sense the magnetic radioactive dispersion on the article; said first sensing means including first signal transmitting means transmitting to a sorting means a first signal proportional to the radioactivity of the dispersion on the article passing through said first sensing means; demagnetizing means to remove magnetism from the article and to prepare the article for cleaning; cleaning means to remove the magnetic radioactive dispersion; second radioactivity sensing means including second signal transmitting means transmitting to said sorting means a second signal proportional to the radioactivity of dispersion remaining on the article from said cleaning means; and sorting means co-ordinating and scheduling said first and second signals.

4. A mechanized magnetic particle inspection apparatus including conveying means to move an article of magnetic material through said apparatus automatically, comprising in combination: a magnetic radioactive dispersion treating container to receive the article; means to induce a magnetic field in the article whereby said treated article is magnetized; rinsing means to remove excess magnetic radioactive dispersion introduced from said treating container; first radioactivity sensing means to sense the magnetic radioactive dispersion left on the article from said rinsing means, said first sensing means including first signal transmitting means transmitting to a sorting means a first signal proportional to the radioactivity of the dispersion on the article passing through said first sensing means; demagnetizing means to remove magnetism from the article and to prepare the article for cleaning; cleaning means to remove the magnetic radioactive dispersion; second radioactivity sensing means including second signal transmitting means transmitting to said sorting means a second signal proportional to the radioactivity of dispersion remaining on the article from said cleaning means and sorting means co-ordinating and scheduling said first and second signals.

5. A mechanized magnetic particle inspection apparatus including conveying means to move an article of magnetic material through said apparatus automatically, comprising in combination: a magnetic radioactive dispersion treating container to receive the article; means to induce a magnetic field in the article whereby said treated article is magnetized; rinsing means to remove excess magnetic radioactive dispersion introduced from said treating container; first radioactivity sensing means to sense the magnetic radioactive dispersion left on the article from said rinsing means, said first sensing means including first signal transmitting means transmitting to a first sorting means a first signal proportional to the radioactivity of the dispersion on the article passing through said first sensing means; first sorting means receiving the first signal and sorting articles into acceptable and unacceptable groups for separate passage to subsequent portions of said apparatus; demagnetizing means to remove magnetism from the article and to prepare the article for cleaning; cleaning means to remove the magnetic radioactive dispersion; second radioactivity sensing means including second signal transmitting means transmitting to a second sorting means a second signal proportional to the radioactivity of dispersion remaining on the article from said cleaning means and a second sorting means receiving the second signal from said second sensing means and sorting articles into groups of radioactive-contaminated and radioactive-uncontaminated articles.

6. In a mechanized magnetic particle inspection apparatus including conveying means to move an article of magnetic material through said apparatus automatically: the combination of first radioactivity sensing means to sense magnetic radioactive dispersion on a magnetized article, said first sensing means including signal transmitting means transmitting to a sorting means a first signal proportional to the radioactivity of magnetic radioactive dispersion on the article passing through said first sensing means; demagnetizing means to remove magnetism from the article and to prepare the article for cleaning; cleaning means to remove the magnetic radioactive dispersion; second radioactivity sensing means including second signal transmitting means transmitting to said sorting means a second signal proportional to the radioactivity of dispersion remaining on the article from said cleaning means and a sorting means co-ordinating and scheduling the first and second signals.

7. A mechanized magnetic particle inspection apparatus comprising a series of operative stations receiving an article of magnetic material, said series including: a first magnetic radioactive dispersion treating station; a second magnetizing station; a third rinsing station to remove excess radioactive magnetic dispersion introduced from said first station; a fourth radioactivity sensing station to sense the magnetic radioactive dispersion left on the article from said third station, said fourth station including signal transmitting means adapted to transmit to an eighth sorting station a signal proportional to the radioactivity of the dispersion on the article passing through said fourth station; a fifth demagnetizing station to remove magnetism and prepare the article for cleaning; a sixth cleaning station substantially to remove the magnetic radioactive dispersion; a seventh radioactivity sensing station including signal transmitting means to transmit to an eighth sorting station a signal proportional to the radioactivity of any dispersion remaining on the article from the sixth station; and an eighth sorting station co-ordinating and scheduling the signals transmitted from said fourth and said seventh stations.

8. A mechanized magnetic particle inspection apparatus comprising a series of operative stations receiving an article of magnetic material, said series including: a first magnetic radioactive dispersion treating station; a second magnetizing station; a third rinsing station to remove excess radioactive magnetic dispersion introduced from said first station; a fourth radioactivity sensing station to sense magnetic radioactive dispersion left on the article from the third station, said fourth station including signal transmitting means transmitting to a fifth sorting station a signal proportional to the radioactivity of the dispersion on the article passing through said fourth station; a fifth sorting station receiving the signal from said fourth station and sorting articles into acceptable and unacceptable groups for separate passage through subsequent stations; a sixth demagnetizing station to remove magnetism and prepare the article for cleaning; a seventh cleaning station substantially to remove magnetic radioactive dispersion from the article; an eighth radioactivity sensing station including signal transmitting means transmitting to a ninth sorting station a signal proportional to the radioactivity of any dispersion remaining on the article from the seventh station; and a ninth sorting station receiving the signal from said eighth station and sorting articles into groups of radioactive-contaminated and radioactive-uncontaminated articles sensed by said eighth station to be safe for handling by human beings.

9. A mechanized magnetic particle inspection method comprising the automatically consecutive steps of: immersing an article of magnetic material in a dispersion comprising about 3 parts magnetic radioactive iron particles and about 1 part water, the particles having a level of radioactivity of 0.01–100 millicuries per gram of material; inducing a magnetic field in the article to position the particles preferentially at defective areas; rinsing the article to remove a large portion of the dispersion leaving a concentration of dispersion at defective areas; measuring the radioactivity of the dispersion on the article; demagnetizing the article; cleansing the article to remove the magnetic radioactive dispersion; measuring the radioactivity of any dispersion remaining on the article to determine if the article can be safely handled by human beings; and then sorting the article into acceptable and unacceptable groups.

References Cited in the file of this patent

UNITED STATES PATENTS

| Re. 19,611 | De Forest | June 18, 1935 |
| 804,610 | Lieber | Nov. 14, 1905 |
| 1,645,599 | Jones | Oct. 18, 1927 |
| 2,267,999 | Switzer | Dec. 30, 1941 |
| 2,430,167 | Fitch | Nov. 4, 1947 |
| 2,461,494 | De Forest | Feb. 8, 1949 |
| 2,462,241 | Wallhausen et al. | Feb. 22, 1949 |
| 2,617,526 | La Pointe | Nov. 11, 1952 |
| 2,717,693 | Holmes | Sept. 13, 1955 |

OTHER REFERENCES

Arthur: Abstract of application Serial No. 206,829, published Feb. 26, 1952, 655 O.G. 1177. (Copy found in 250–83.)